A. FRIBERG.
PROTECTIVE DEVICE FOR SHIPS.
APPLICATION FILED OCT. 23, 1915.
1,185,494.
Patented May 30, 1916.
2 SHEETS—SHEET 1.
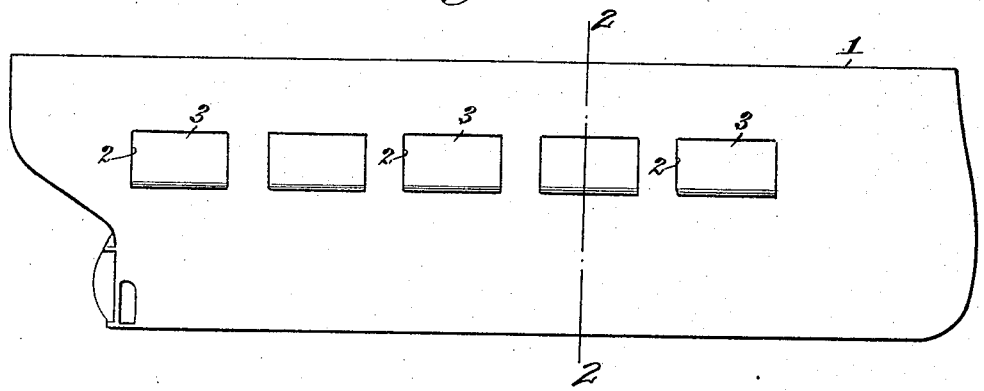
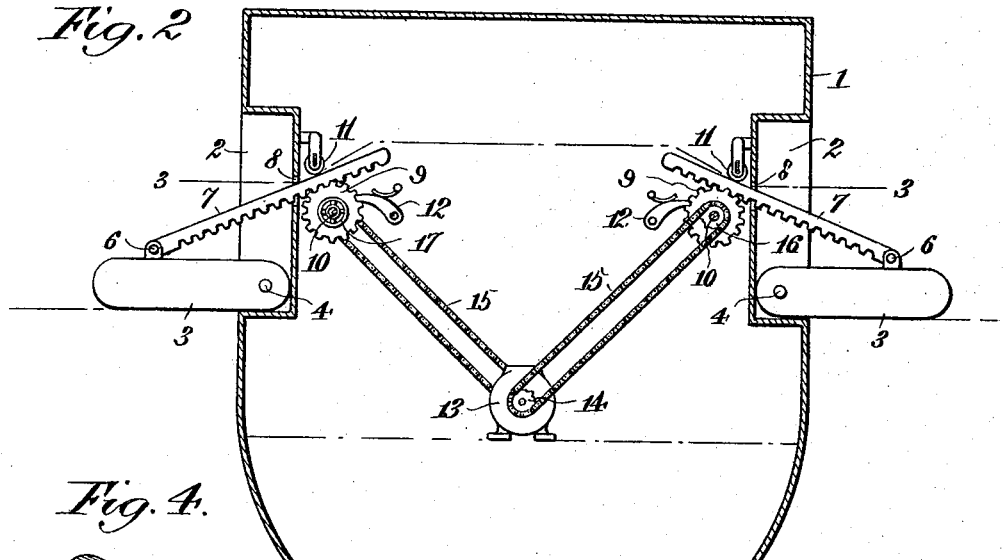
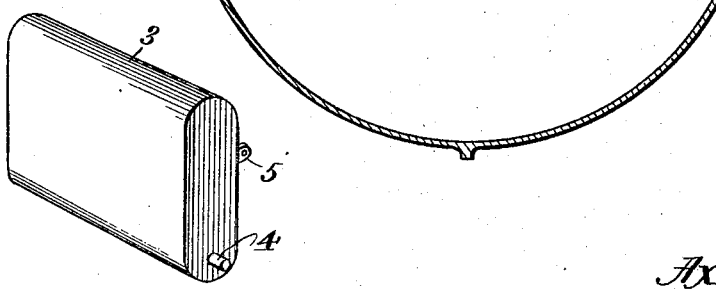
Witnesses:
C. Peinle, Jr.
Inventor,
Axel Friberg.
By Victor J. Evans,
Attorney.

A. FRIBERG.
PROTECTIVE DEVICE FOR SHIPS.
APPLICATION FILED OCT. 23, 1915.
1,185,494.
Patented May 30, 1916.
2 SHEETS—SHEET 2.
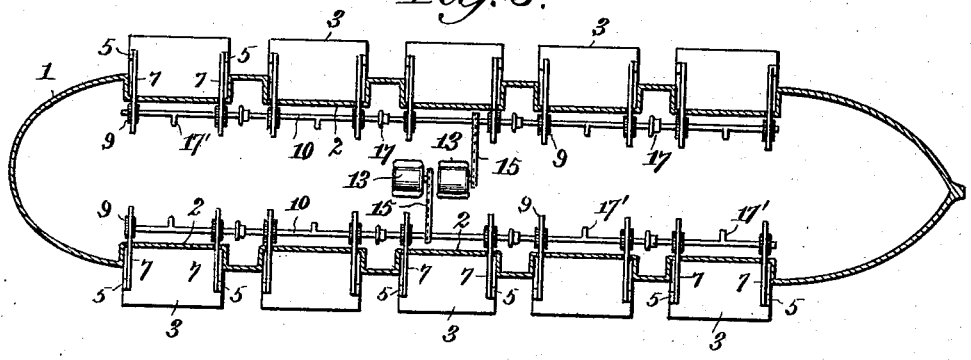
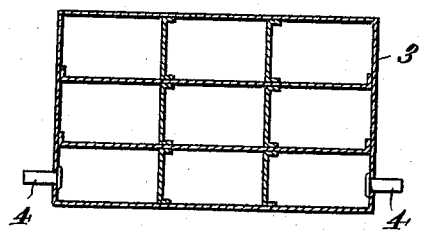
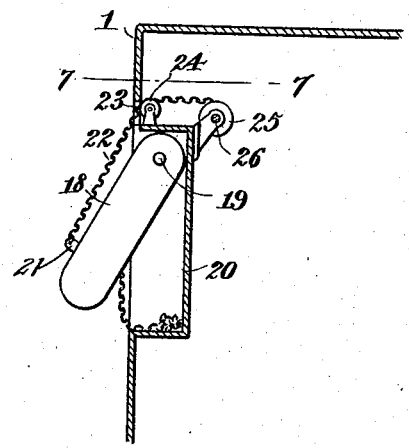
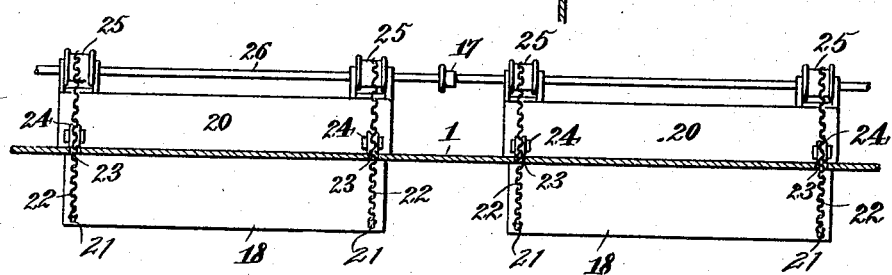
Inventor,
Axel Friberg.
By Victor J. Evans,
Attorney.
Witnesses:

UNITED STATES PATENT OFFICE.

AXEL FRIBERG, OF BINGHAMTON, NEW YORK.

PROTECTIVE DEVICE FOR SHIPS.

1,185,494.  Specification of Letters Patent.  Patented May 30, 1916.

Application filed October 23, 1915. Serial No. 57,490.

*To all whom it may concern:*

Be it known that I, AXEL FRIBERG, a citizen of the United States, residing at Binghamton, in the county of Broome and State of New York, have invented new and useful Improvements in Protective Devices for Ships, of which the following is a specification.

This invention relates to protective devices for ships or other craft.

In carrying out my invention it is my purpose to provide a vessel with pivoted members, in the nature of buoys or pontoons which may be readily swung over the side and sustained at right angles to the vessel to prevent the same from listing when too much weight is arranged upon either of the sides of the vessel or to sustain the same against sinking when damaged.

Another object of the invention is to provide a ship or other vessel with substantially rectangular compartments let in its sides disposed above the water line, to arrange within each of the compartments an air and water tight body, to divide the body into a plurality of separable compartments, and to provide means whereby all or any of said bodies may be swung against the side of the vessel and held in such position to contact with the surface of the water and the buoy to float the vessel when the vessel is damaged.

With the above and other objects in view, the improvement resides in the construction, combination and arrangement of parts set forth in the following specification and falling within the scope of the appended claim.

In the drawings: Figure 1 is a view of a vessel constructed in accordance with my invention, Fig. 2 is an enlarged transverse sectional view approximately on the line 2—2 of Fig. 1, the float or buoy being shown swung to a right angle with respect to the side of the vessel, Fig. 3 is a horizontal sectional view approximately on the line 3—3 of Fig. 1, the floats being in the position illustrated in Fig. 2, Fig. 4 is a perspective view of one of the floats, Fig. 5 is a horizontal sectional view through the same, Fig. 6 is a transverse sectional view through a vessel illustrating a modification, and Fig. 7 is a horizontal sectional view approximately on the line 7—7 of Fig. 6.

Referring now to the drawings in detail, the numeral 1 designates a ship or other vessel of any class or design, the same being provided upon its sides with spaced depressions 2 forming compartments for the buoying members or pontoons 3. Each of the compartments 2 is of a substantially rectangular formation, and the members 3 are of a like shape so as to be snugly received one within each of the said compartments. The compartments are arranged in a line one with the other, but the same are properly spaced so as to not interfere with the port holes and also away from the davits so as not to interfere with the launching of the life boats.

The members 3 which, for the sake of convenience, will hereinafter be referred to as the pontoons, are of a hollow air and water tight construction, and are provided with longitudinal and transverse partitions dividing the same into a plurality of individual compartments. The pontoons 3 have laterally extending stub axles 4 arranged adjacent one of their longitudinal edges, the same being journaled in suitable bearings, in a manner to permit of the said pontoons being swung to a right angle with respect to the side of the vessel. The pontoons 3 provided upon their inner faces at their ends and adjacent their edges opposite that provided with the shafts and trunnions 4, are formed with lugs 5, and to each of these lugs is pivotally connected, as at 6, a rack bar 7. Each of the rack bars extends through a suitable opening 8 through the inner wall of the compartments 2 and the teeth of each of the members is adapted to be engaged by toothed wheels 9—9 that are splined or otherwise secured upon longitudinally extending shafts 10—10. The numerals 11 designate spring pressed roller members which contact with the edges of the bars 7 opposite that provided with the teeth and which are adapted to sustain the same in co-acting relation with the toothed wheels 9, while the numerals 12 designate pawls which engage between the teeth of the wheels 9 or which may engage with sprocket wheels arranged upon the shafts 10 between each pair of toothed wheels 9. Any suitable means may be provided for operating the shafts 10, as for instance, an electric motor 13 which may have its shaft provided with a sprocket wheel 14 to receive an endless sprocket chain 15 that engages with the sprocket wheel 16 upon the shaft 10. The shaft 10 comprises a plurality of sections, one section being provided for each pontoon, but all of the sections may be connected by suitable coupler members 17, which couplers when moved in one direction disconnect the shaft sections, and each of the said shaft sections is provided with a right angular offset member forming the same with a handle 17' whereby any of the shafts may be independently operated to swing any of the pontoons to a desired angle with relation to the side of the vessel.

In Figs. 6 and 7 the pontoon 18 is of a structure similar to that previously described, but the same has what may be termed its upper ends pivotally secured, as at 19, in its compartment 20. The outer face of the pontoon 18 is formed with lugs 21 to which is attached a chain 22, the said chain passing through an opening 23 in the side of the vessel above the compartment 20 and being trained over a guide sheave 24 and directed to a drum 25 that is mounted on a shaft 26. The shaft 26 is of a similar construction to the shaft 10, that is the same may be actuated by motive power or hand power, and each of the shafts 26 comprises a plurality of members, which arrangement, it will be noted permits of any of the individual pontoons being operated or all of the said pontoons being simultaneously swung to proper position against the side of the vessel.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

A ship or similar vessel having its sides provided with depressed portions forming compartments which are arranged above the water line of the vessel, a pontoon filling each of the compartments, each of said pontoons comprising a water and air tight member provided with a plurality of compartments, members connected with the pontoons and passing through openings in the sides of the vessel, and means co-acting with said members for swinging and sustaining the pontoon outwardly of the compartment or retaining the said pontoon in the compartment.

In testimony whereof I affix my signature in presence of two witnesses.

AXEL FRIBERG.

Witnesses:
Mrs. A. A. FRIBERG,
BEDA J. FRIBERG.

Copies of this patent may be obtained for five cents each, by addressing the "Commissioner of Patents, Washington, D. C."